(12) United States Patent
Hines (10) Patent No.: US 12,544,300 B1
(45) Date of Patent: Feb. 10, 2026

(54) ORAL MASSAGE DEVICE

(71) Applicant: Lawanda Hines, Perris, CA (US)

(72) Inventor: Lawanda Hines, Perris, CA (US)

(*) Notice: Subject to any disclaimer, the term of this patent is extended or adjusted under 35 U.S.C. 154(b) by 1026 days.

(21) Appl. No.: 17/677,252

(22) Filed: Feb. 22, 2022

Related U.S. Application Data

(60) Provisional application No. 63/151,584, filed on Feb. 19, 2021.

(51) Int. Cl.
| A61H 19/00 | (2006.01) |
| A61C 5/00 | (2017.01) |
| A61H 15/00 | (2006.01) |

(52) U.S. Cl.
CPC ............. *A61H 19/32* (2013.01); *A61C 5/007* (2013.01); *A61H 15/00* (2013.01); *A61H 19/50* (2013.01); *A61H 2015/005* (2013.01); *A61H 2201/1253* (2013.01)

(58) Field of Classification Search
CPC ...................................................... A61C 5/007
See application file for complete search history.

(56) References Cited

U.S. PATENT DOCUMENTS

| 5,499,633 A * | 3/1996 | Fenton ..................... A61F 5/566 |
| | | 128/859 |
| 9,526,669 B1 * | 12/2016 | McCall .................. A61H 19/50 |
| 10,765,596 B1 * | 9/2020 | Hess ........................ A61H 1/00 |
| 2004/0007239 A1 * | 1/2004 | Eubank ..................... A61C 7/08 |
| | | 128/861 |
| 2011/0258792 A1 * | 10/2011 | Steur ..................... A61C 17/349 |
| | | 15/21.1 |
| 2012/0017922 A1 * | 1/2012 | Hirshberg ............. A63B 71/085 |
| | | 128/861 |
| 2013/0042876 A1 * | 2/2013 | Hermanson ............. A61F 5/566 |
| | | 128/848 |

* cited by examiner

*Primary Examiner* — Thaddeus B Cox
(74) *Attorney, Agent, or Firm* — John Rizvi; John Rizvi, P.A.—The Patent Professor®

(57) ABSTRACT

An oral massage device is provided for receipt in the mouth of a user to lessen pressure on the jaws of a user during oral massaging a penis or member of a subject. The oral massage device includes an upper guard defining an upper channel for receiving upper teeth of a user, a lower guard defining a lower channel for receiving lower teeth of a user and a pair of spacer shaft connecting and spacing apart the upper and lower guards and providing support to upper and lower jaws of the user to relieve muscular tension and stress on the upper and lower jaws of the user. The oral massage device includes a stimulation device in the form of a plurality of roller balls or vibratory devices to stimulate the member of the subject. The oral massage device may further include fluid holes formed through the upper guard to deliver flavored liquid or gel located in the upper channel of the upper guard into the mouth of the user.

16 Claims, 8 Drawing Sheets

ORAL MASSAGE DEVICE

CROSS-REFERENCE TO RELATED APPLICATIONS

This application claims the benefit of U.S. Provisional Patent Application No. 63/151,584, filed on Feb. 19, 2021, which is incorporated by reference herein in its entirety.

FIELD OF THE INVENTION

The present invention relates generally to oral massage devices, and more particularly, to an oral massage device to relieve muscle pressure on jaws of a provider during oral sex and to enhance stimulation to a penis or member of a subject to encourage an earlier climax.

BACKGROUND OF THE INVENTION

Oral sex is often used to pleasure a subject and encourage the subject to climax or organism. During oral sex, a provider receives a penis or member of a subject in their mouth to stimulate the subject to an organism or climax. This may take some time to accomplish requiring the provider to hold their jaws in an open condition for an extended period of time. This places a stress and strain on the muscles of the jaws of the provider and gets increasingly uncomfortable.

Additionally, as the jaws of the provider become tired, the teeth of the provider may engage the sensitive outer skin of the member of the subject rendering it uncomfortable for the subject as well. Extended contact with the teeth of the provided may damage or injure the outer skin of the member of the user.

Accordingly, there is need for a solution to at least one of the aforementioned problems. For instance, there is an established need for an oral massage device that can relieve stress and pressures on the mouth of the provider during oral sex. There is a further established need for an oral massage device that can stimulate a subject to an earlier climax to relieve stresses on the jaws of a provider. There is a still further established need for an oral massage device that can protect the sensitive outer skin of a member of a subject from the teeth of a provider oral sex.

SUMMARY OF THE INVENTION

The present invention is directed to an oral massage device for receipt in the mouth of a provider or user to lessen pressure on the jaws of the user during oral massaging of a penis or member of a subject. The oral massage device generally includes an upper guard defining an upper channel for receiving upper teeth of a user, a lower guard defining a lower channel for receiving lower teeth of a user and a pair of spacer shaft connecting and spacing apart the upper and lower guards and providing support to upper and lower jaws of the user to relieve muscular tension and stress on the upper and lower jaws of the user. The oral massage device includes a stimulation device in the form of a plurality of roller balls or vibratory devices to stimulate the member of the subject. The oral massage device may further include fluid holes formed through the upper guard to deliver a flavored liquid or gel located in the upper channel of the upper guard into the mouth of the user.

In a first implementation of the invention, there is provided an oral massage device for receipt in a mouth of a user to stimulate a penis or member of a subject, the oral massage device comprising:

a mouth guard having an upper guard defining an upper channel and a lower guard defining a lower channel;
a first spacer shaft attached to and extending between said upper guard and said lower guard;
a second spacer shaft attached to and extending between said upper guard and said lower guard; and
a stimulation device positioned on at least one of said upper and lower guards.

In a second aspect, the stimulation device is a plurality of roller balls.

In another aspect, the stimulation device includes a plurality of roller balls positioned on the upper guard.

In another aspect, the stimulation device includes a plurality of roller balls rotatably supported in a track in the upper guard.

In another aspect, the stimulation device includes a plurality of roller balls positioned on the lower guard.

In another aspect, the stimulation device includes a plurality of roller balls rotatably mounted in a track in the lower guard.

In another aspect, the upper guard includes at least one fluid drip hole therethrough.

In another aspect, the stimulation device is a vibratory device.

In another aspect, the vibratory device is positioned on the upper guard.

In another aspect, the vibratory device is positioned on the lower guard.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an oral penile massage device which can be positioned between the teeth of the user and relieve tension on the jaw of the user while assisting in massaging a penile member of a subject.

Figure 1:
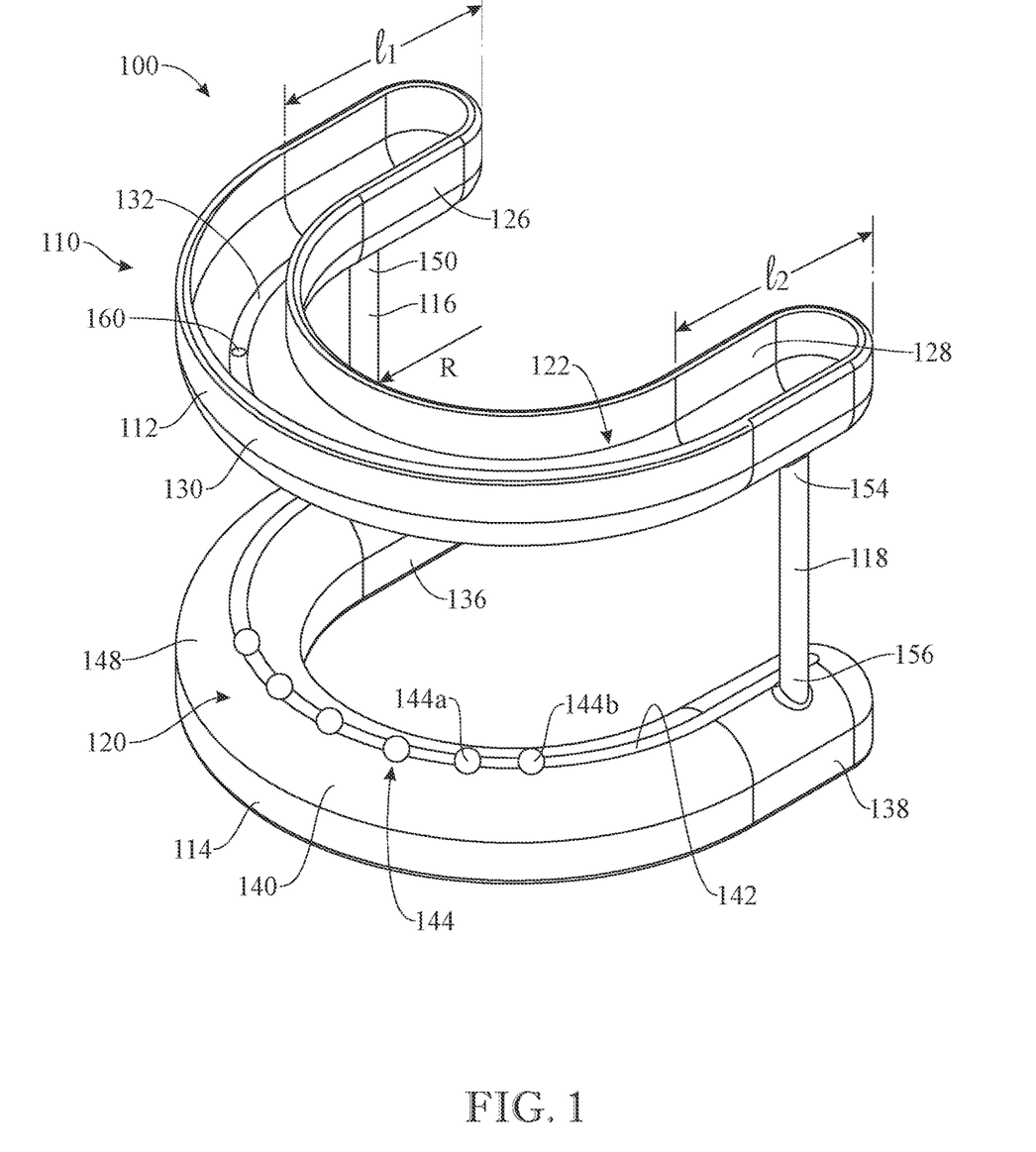
FIG. 1 presents a top, front isometric view of oral massage device in accordance with a first illustrative embodiment of the present invention.
Figures 2, 2A, 2B:
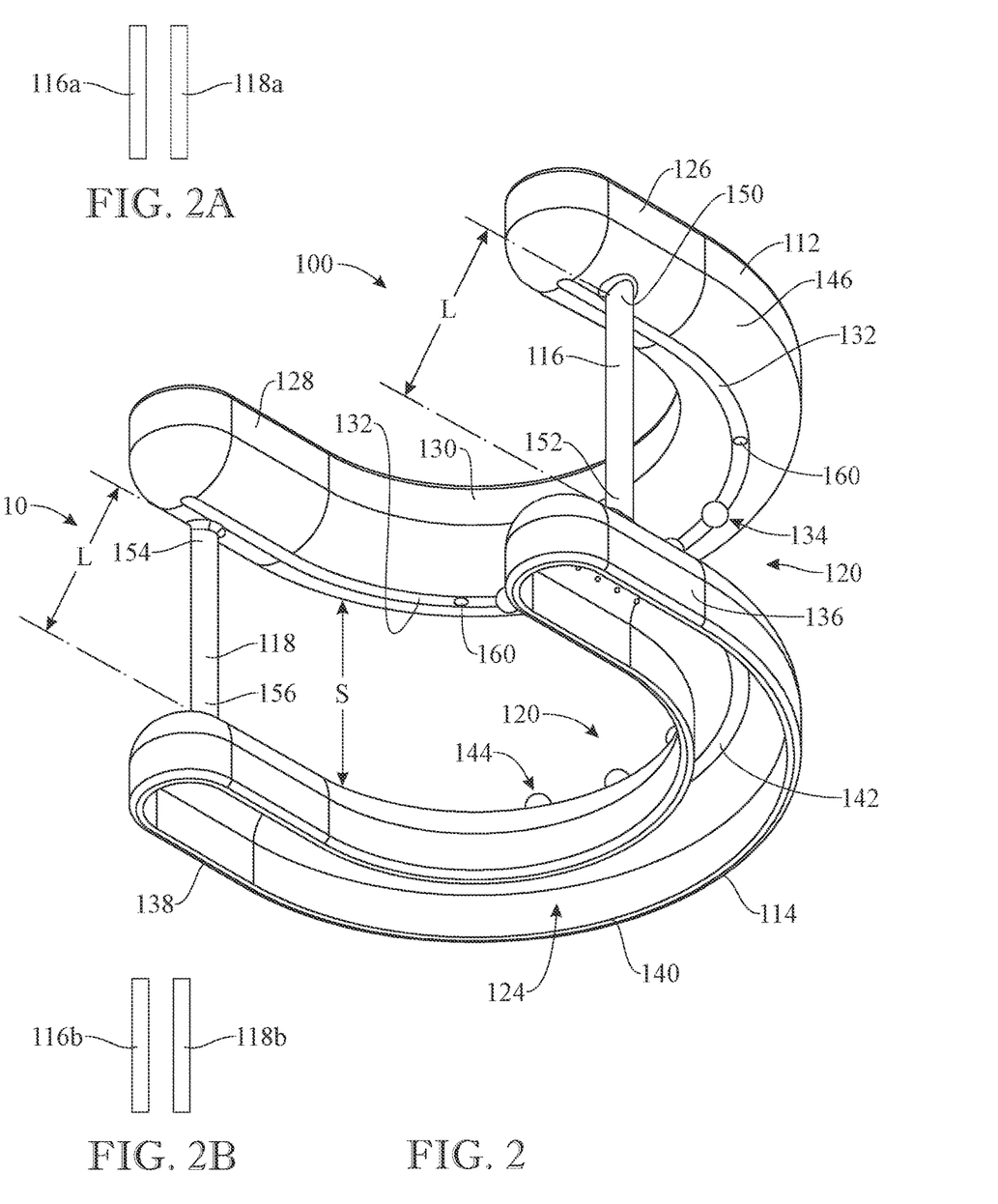
FIG. 2 presents a bottom, rear isometric view of the oral massage device of FIG. 1 in accordance with the first illustrative embodiment of the present invention.
FIG. 2A is a side elevation view of a first and a second spacer shaft having a long length.
FIG. 2B is a side elevation view of a first and second spacer shaft having a short length.
Figure 3:
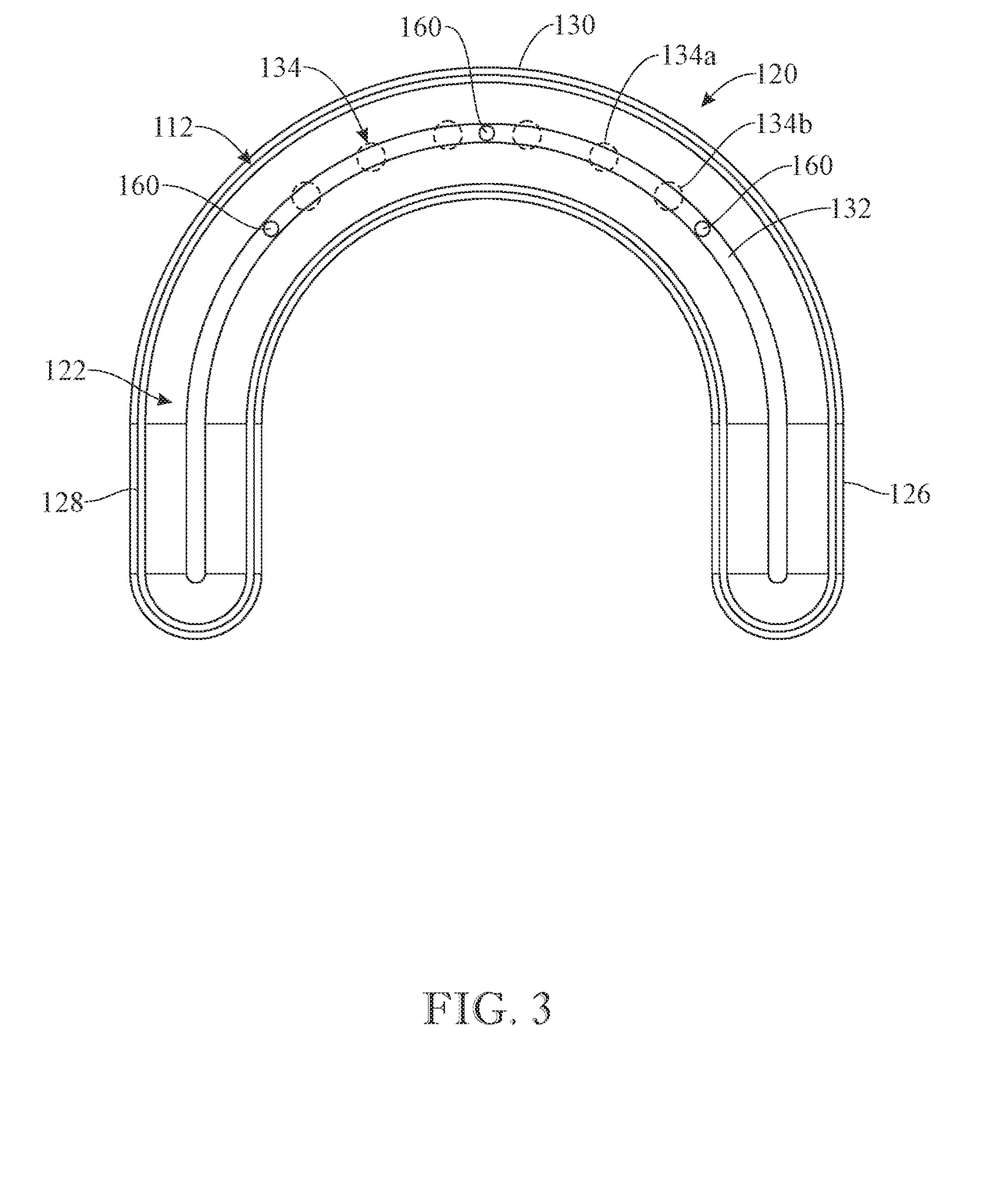
FIG. 3 presents a top, plan view of the oral massage device of FIG. 1 in accordance with the first illustrative embodiment of the present invention.

Referring initially to FIGS. 1-7, and initially to FIGS. 1-3, an oral penile massage device, hereinafter oral massage device 100, is illustrated in accordance with a first exemplary embodiment of the present invention. As shown, the oral massage device 100 generally includes a mouth guard 110 having an upper guard 112 for receipt of an upper set of teeth of a user and a lower guard 114 for receipt of a lower set of teeth of a user as described in more detail hereinbelow.

The oral massage device 100 additionally includes a first spacer shaft 116 and a second spacer shaft 118. The first and second spacer shafts 116 and 118, respectively, are attached to the mouth guard 110 to maintain separation of the upper and lower guards 112 and 114, respectively, of the mouth guard 110 and to relieve muscle tension on the jaws of a user. The oral massage device 100 further includes a plurality of roller balls 120 associated with, and coupled to, the upper guard 112 and/or the lower guard 114 to massage a subject's penile member (not shown) hereinafter "member" during use.

The upper guard 112 defines an upper channel 122 to for receipt of a users upper set of teeth and the lower guard 114 defines a lower channel 124 for receipt of the users lower set of teeth. As shown, the upper guard 112 is generally horseshoe shaped having a first upper end portion 126, a second upper end portion 128 and an arcuate central portion 130. An upper track 132 extends across the upper guard 112 to movably secure some of the plurality of roller balls 120. Specifically, the plurality of roller balls 120 includes a plurality of upper roller balls 134. The plurality of upper roller balls 134 are movably secured within the upper track 132 such that the plurality of upper roller balls 134 are constrained within the upper track 132 and are free to rotate within the upper track 132. In a specific embodiment, the plurality of upper roller balls 134 are positioned in the arcuate central portion 130 of the upper guard 112 to better position them for engagement with a member of a subject.

Likewise, the lower guard 114 is also similarly horse shoe shaped and includes a first lower end portion 136, a second lower end portion 138 and an arcuate central portion 140 intermediate the first and second lower end portion 136 and 138, respectively. The lower guard 114 includes a lower track 142 movably retaining a plurality of lower roller balls 144 of the plurality of roller balls 120. The plurality of lower roller balls 114 are also retained in the arcuate central portion 140 of the lower guard 114 to better position them for engagement with the member of the subject.

More specifically, in the disclosed embodiment, the upper track 132 of the upper guard 112 is formed in an undersurface 146 of the upper guard 112 (FIG. 2). The lower track 142 is similarly formed in an over surface 148 of the lower guard 114 (FIG. 1).

The upper and lower guards 112 and 114 are preferably mirror images of each other given the generally symmetrical shapes of a users upper and lower jaws and teeth. The arcuate central portions 130 and 140 of the upper and lower guards 112 and 114, respectively, have a common radius "R". Likewise, the lengths "l1" of the first upper and lower end portion 126 and 136 are identical as are the lengths "l2" of the second upper and lower end portions 128 and 138 or the upper and lower guards 112 and 114, respectively. It should be noted that, in situations wherein the particular user has differing upper and lower jaw shapes, customs upper and lower guards 112 and 114 may be made having differing radii "R" and/or differing lengths "l1" and/or "l2".

As noted herein above, the first and second spacer shafts 116 and 118, respectively, are provided to maintain the upper and lower guards 112 and 114 in a spaced apart relation to relieve any stress or tension on muscles of the jaws of the user. The first spacer shaft 116 has an upper end 150 affixed to or mounted in the first upper end portion 126 of the upper guard 112 and a lower end 152 affixed to or mounted in the first lower end portion 136 of the lower guard 114. The second spacer shaft 118 has an upper end 154 affixed to or mounted in the second upper end portion 128 of the upper guard and a lower end 156 affixed to or mounted in the second lower end portion 138 of the lower guard 114.

The first and second spacer shafts 116 and 118 are of substantially the same length L and may be fixedly mounted to the upper and lower guards 112 and 114 of the mouth guard 110 or may be removably mounted therein. The oral massage device 100 may be provided as a single unit of a specific size with the spacing "S" between the upper and lower guards 112 and 114, respectively, fixed to length "L" (FIG. 2).

Alternatively, the oral massage device 100 may have an adjustable spacing "S" equal to the length "L" between the upper and lower guards 112 and 114, respectively. This is accomplished by attaching the first and second spacer shafts 116 and 118 to the upper and lower guards 112 and 114 in a removable manner. Pairs of first and second spacer shafts 116 and 118 having differing lengths "L" are provided to permit the user to customize the spacing between the upper and lower guards 112 and 114 to the most comfortable spacing to accommodate the specific distance between their upper and lower teeth as described in more detail hereinbelow. For example, longer first and second spacer shafts 116a and 118b (FIG. 2A) or shorter first and second spacer shafts 116b and 118b (FIG. 2B) may be provided to accommodate jaw openings of differing sizes.

The oral massage device 100 is formed from a variety of materials that are both comfortable and sanitary. The first and second spacer shafts 116 and 118 may be formed of a relatively strong material so as to relieve pressure on the jaws of a user. The first and second spacer shafts 116 and 118 may be formed from a polymer or plastic material, a metallic material to lend strength, an organic material such as, for example, bamboo, wood, etc. Preferably, the first and second spacer shafts 116 and 118 are formed of a material that is easily sterilizable before and after use.

The upper and lower guards 112 and 114 of the oral massage device are preferably formed of a soft, non-abrasive material such as, for example, plastic, polymer or silicone rubber, etc for both the comfort of the user and the subject. The material chosen for the upper and lower guards 114 and 112 is also easily sterilizable for the protection of both the user and subject.

In order to further enhance the pleasure to the user, the oral massage device 100 may be formed of a material that is or can incorporate various flavors. In a specific embodiment, the oral massage device 100 includes one or more fluid holes 160 (FIG. 3) formed through the upper guard 112 to allow a variety of fluids to pass from the upper channel 122 in the upper guard 112 and into the users mouth and/or onto the subjects member. For example, as discussed below, various flavored fluids or soft gels may be provided in the upper channel 122 in the upper guard 112 which flow through the fluid holes 160 and into the users mouth to enhance their pleasure during use. These fluids and/or soft gels may have a variety of flavorings such as, for example, apple, grape, banana, strawberry, watermelon, etc.

Additionally, the fluids or soft gels provided in the upper channel 122 of the upper guard 112 may include various lubricants, both flavored and unflavored, to permit the subjects member to slide more easily through the oral massage device 100. Still further, the lubricants may additionally lubricate the plurality of roller balls 120, including the plurality of upper and lower roller balls 134 and 144, respectively, to permit them to rotate more easily through their respective upper and lower tracks 132 and 142 to prevent binding therein and causing pain or damage to the subject and/or his member.

Figure 4:
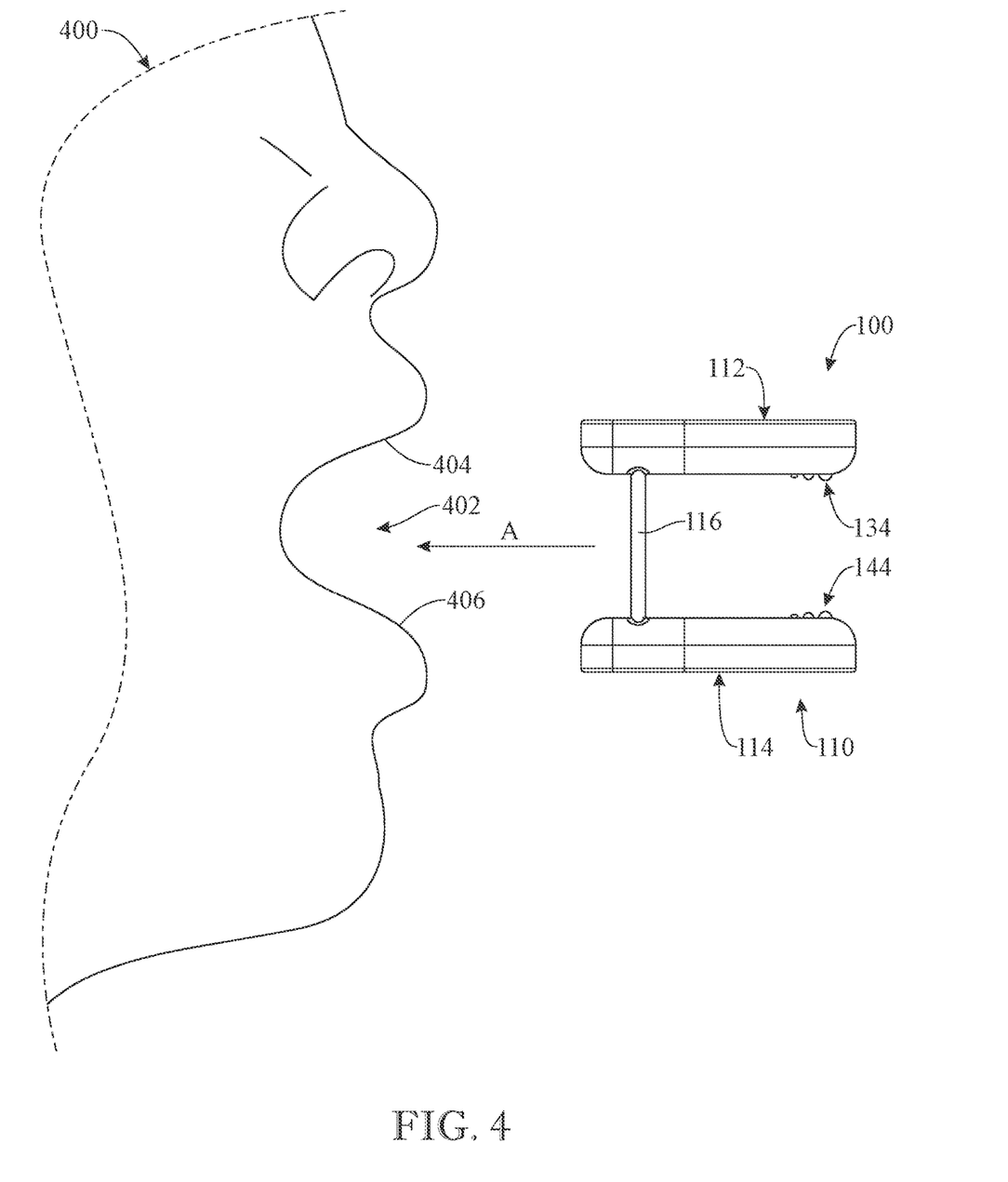
FIG. 4 presents a side elevation view of the oral massage device of FIG. 1 during insertion into a mouth of a user.
Figure 5:
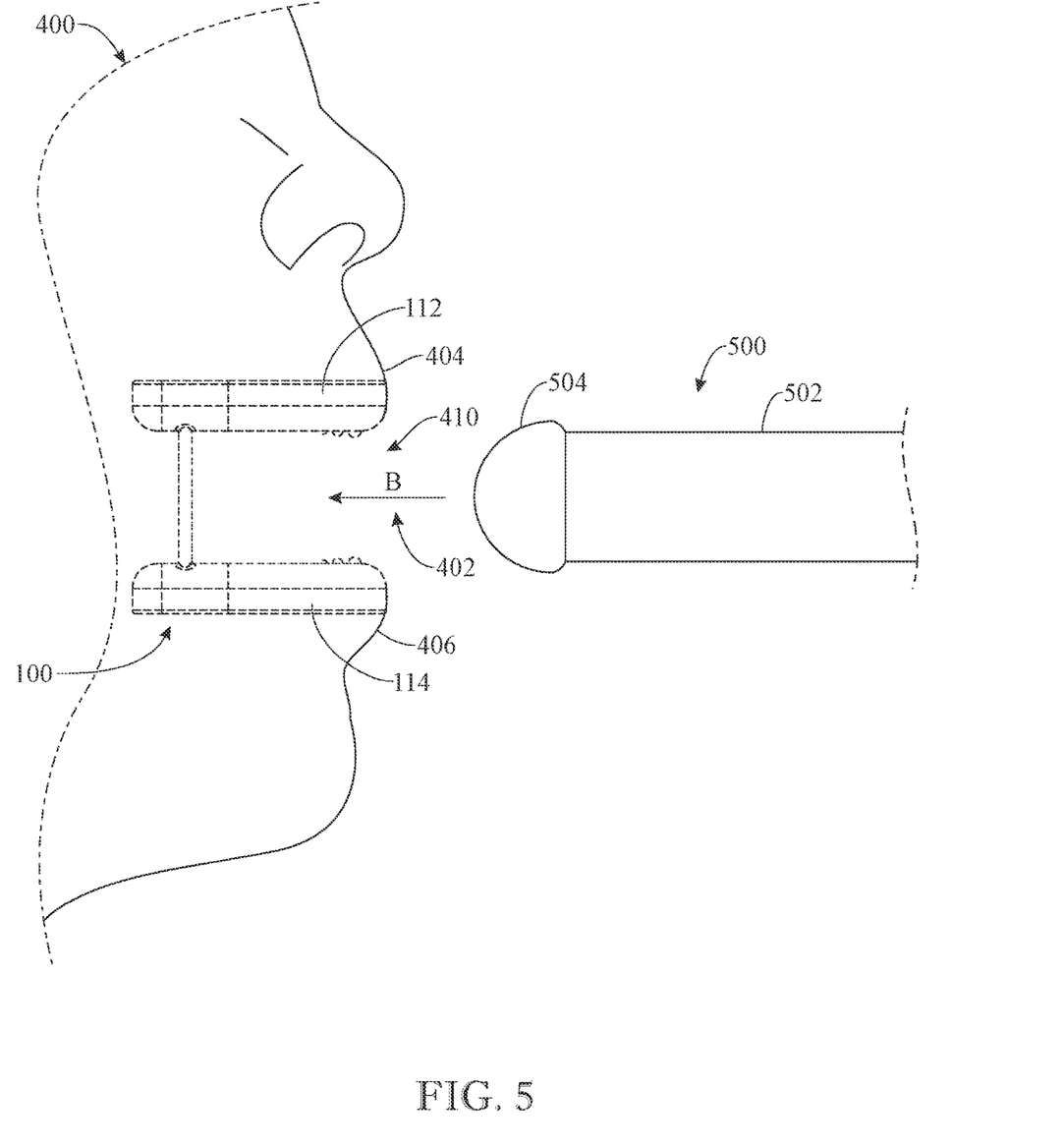
FIG. 5 presents a side elevation view, similar to FIG. 4, of the oral massage device of FIG. 1 inserted into the mouth of the user and in position to accept a penile member of a subject.

Referring now to FIGS. 4-7, and initially to FIGS. 4 and 5, in use, a person who is to be using the disclosed oral massage device on a penis or member of a subject, for example, user 400, chooses the correct oral massage device 100 having the spacing "S" (FIG. 2) which will be most comfortable form them. Additionally, the chosen oral massage device 100 may be pre-flavored or specific flavorings in liquid or gel form can be chosen and pre-positioned or deposited into the upper and lower channels 122 and 124 of the upper and lower guards 112 and 114, respectively, prior to insertion into a user's mouth as discussed in more detail hereinbelow.

As noted hereinabove, the oral massage device 100 can be provided in various sizes in both the spacing "S" between the upper and lower guards 112 and 114 as well as the sizes of the upper and lower guards 112 and 114 to accommodate jaw and teeth configurations themselves. Where provided, the correct spacing "S" can also be accomplished by assembling the mouth guard 110 with the appropriate length first and second spacer shafts 116 and 118 (FIG. 2).

Additionally, and as noted hereinabove, the oral massage device 100 to be used, may be chosen with a specific radius "R" and lengths "l1" and "l2" of the central portions 130, 140 and first and second upper and lower end portions 126, 136, 128 and 138, respectively (FIG. 1) or may be custom made.

When a user, such as, for example, user 400 is ready to use the oral massage device 100, the user 400 inserts the oral massage into their mouth 402 in the direction of arrow "A" (FIG. 4) and positions the oral massage device 100 between their upper and lower jaw 402 and 404, respectively (FIG. 5). While not specifically shown, the user 400 places the teeth of their upper jaw 402 in the upper channel 122 defined by the upper mouth guard 112 and the teeth of their lower jaw 404 in the lower channel 124 defined by the lower mouth guard 114.

In use, the user 400 positions the oral massage device 100 in such a manner so as to receive a penis or member 500, hereinafter member 500, between the upper and lower guards 112 and 114 of the oral massage device 100. The member 500 is inserted between the upper and lower guards 112 and 114 of the oral massage device 100 in the direction of arrow "B" such that a portion of a shaft 502 and a head 504 of the member 500 pass into the oral massage device 100 (FIG. 5)

Figure 6:
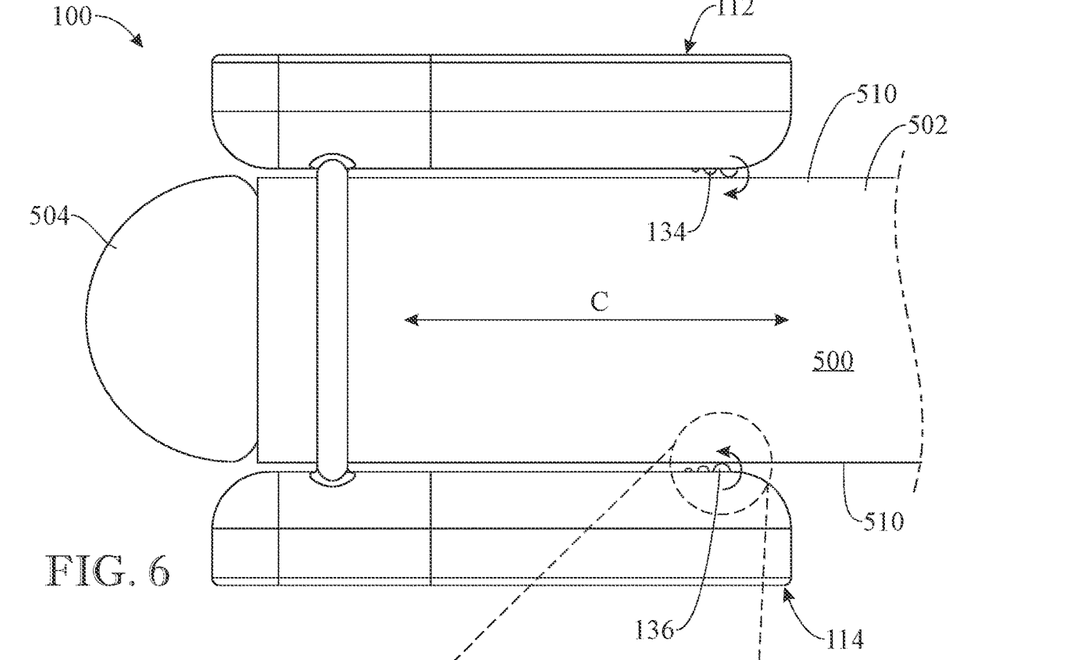
FIG. 6 presents an isolated side plan view of the oral massage device of FIG. 5 during insertion of the subjects penile member between upper and lower guards of the oral massage device of FIG. 1.

Referring now to FIG. 6, once the head 504 and shaft 502 of the member 500 have been positioned within the oral massage device 100, the member 500 can be reciprocated back and forth in the direction of arrow "C" to massage the member 500 with the oral massage device 100. During the duration of the movement of the member 500 within the oral massage device 100, and thus within the mouth 402 of the user 400, the oral massage device 100 supports the upper and lower jaws 404 and 406 of the user 400 to relieve any pressure or muscle tension in the mouth 402 of the user 400 such that the user 400 may relax their upper and lower jaws 404 and 406. This renders the procedure of massaging a subjects member 500 much more comfortable for the user 400.

Figure 6A:
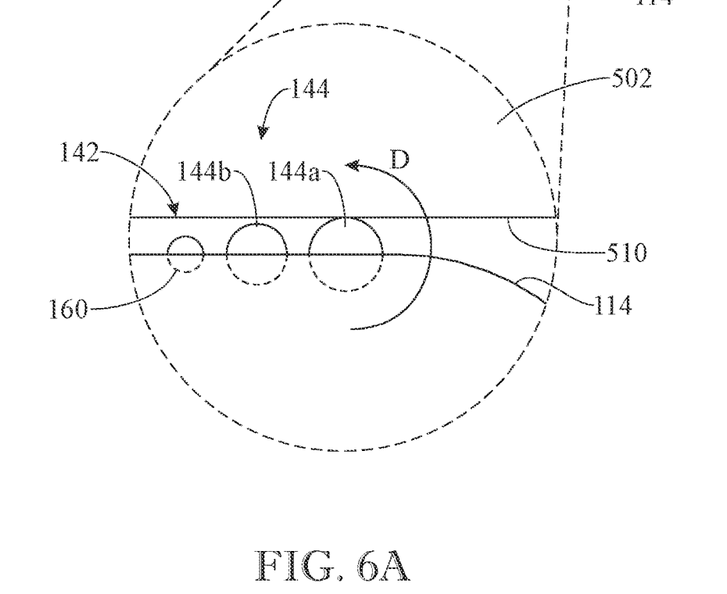
FIG. 6A is an enlarged area of detail view of FIG. 6 illustrating roller balls positioned in a track of the lower guard of the oral massage device of FIG. 1.

As best shown in FIG. 6A, during the reciprocal motion of the shaft 502 of the member 500 within the oral massage device 100, the plurality of roller balls 120 (FIG. 1), including the plurality of upper and lower roller balls 134 and 144, respectively, massage an outer skin 510 of the member 500 to stimulate the member 500 of the subject (not shown). As shown, for example, the plurality of lower roller balls 134 rotate reciprocally within in the lower track 142 in the lower guard 114 in the direction of arrow "D" as the member 500 is moved in the direction of arrow "C". It should be noted that, individual roller balls 134, such as, for example roller balls 144a and 144b, may have differing sizes, textures, etc. to further stimulate the member 500 of the user.

The enhanced stimulation provided by the oral massage device 100 can cause the subject to achieve climax earlier than by massaging by the bare upper and lower jaws 404 and 406 of the user 400. Additionally, the sensitive outer skin 510 of the member 500 is protected from the teeth (not shown) in the upper and lower jaws 404 and 406 of the user 400 by the upper and lower guards 112 and 114 of the oral massage device 100.

Figure 7:
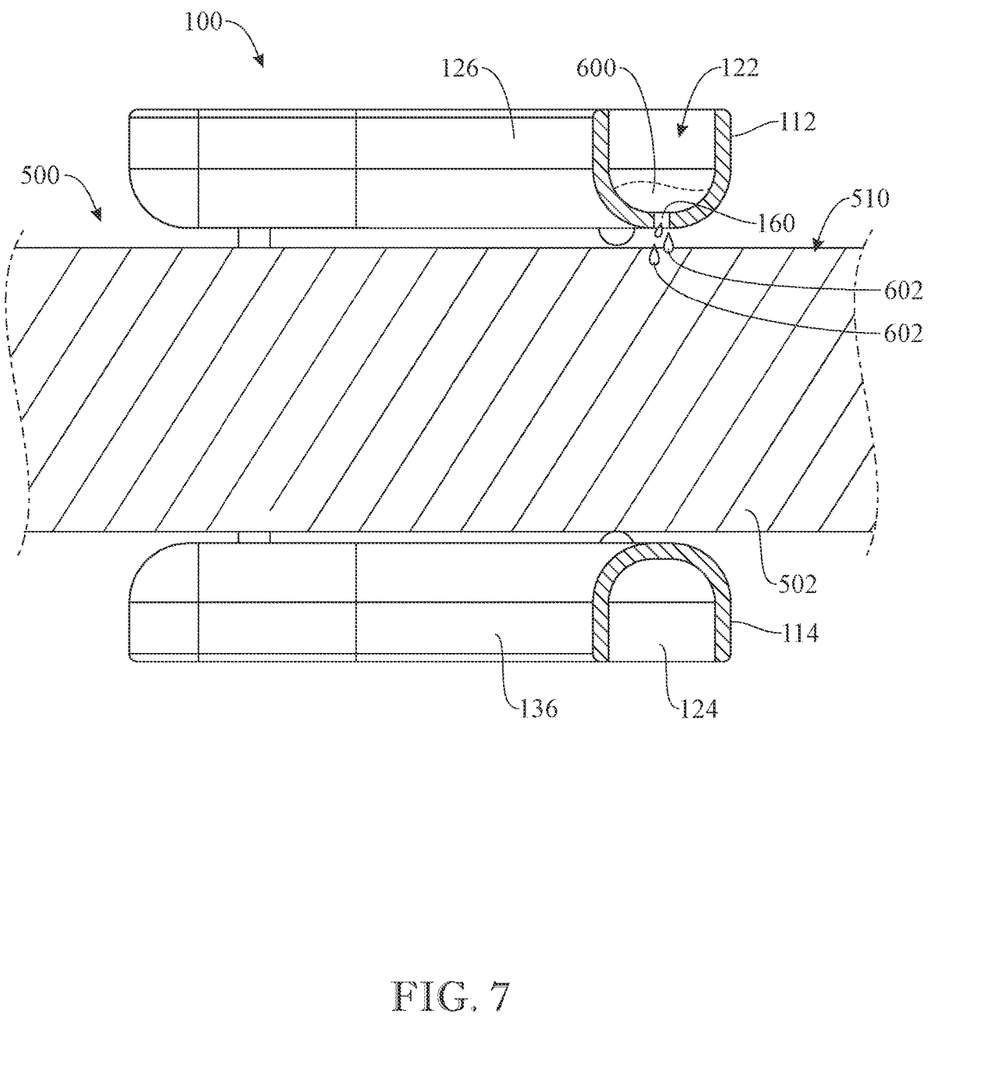
FIG. 7 is a side elevation view, shown in section, of the oral massage device of FIG. 1 positioned about the penile member of the subject and dripping flavoring or lubricant onto the penile member of the subject through holes formed in the upper guard of the oral massage device of FIG. 1.

Referring for the moment to FIG. 7, during use, the flavored gel or liquid, such as for example flavored liquid 600, retained in the upper channel 122 of the upper guard 112, drips through the fluid holes 160 in the form of flavored droplets 602. These flavored droplets 602 drop on and around the shaft 502 of the member 500 of the subject and into the mouth 402 of the user thus enhancing the pleasure of the user 400. As noted hereinabove, the fluid or gel may be a lubricant to both lubricate the member 500 as well as the plurality of roller balls 120.

Figure 8:
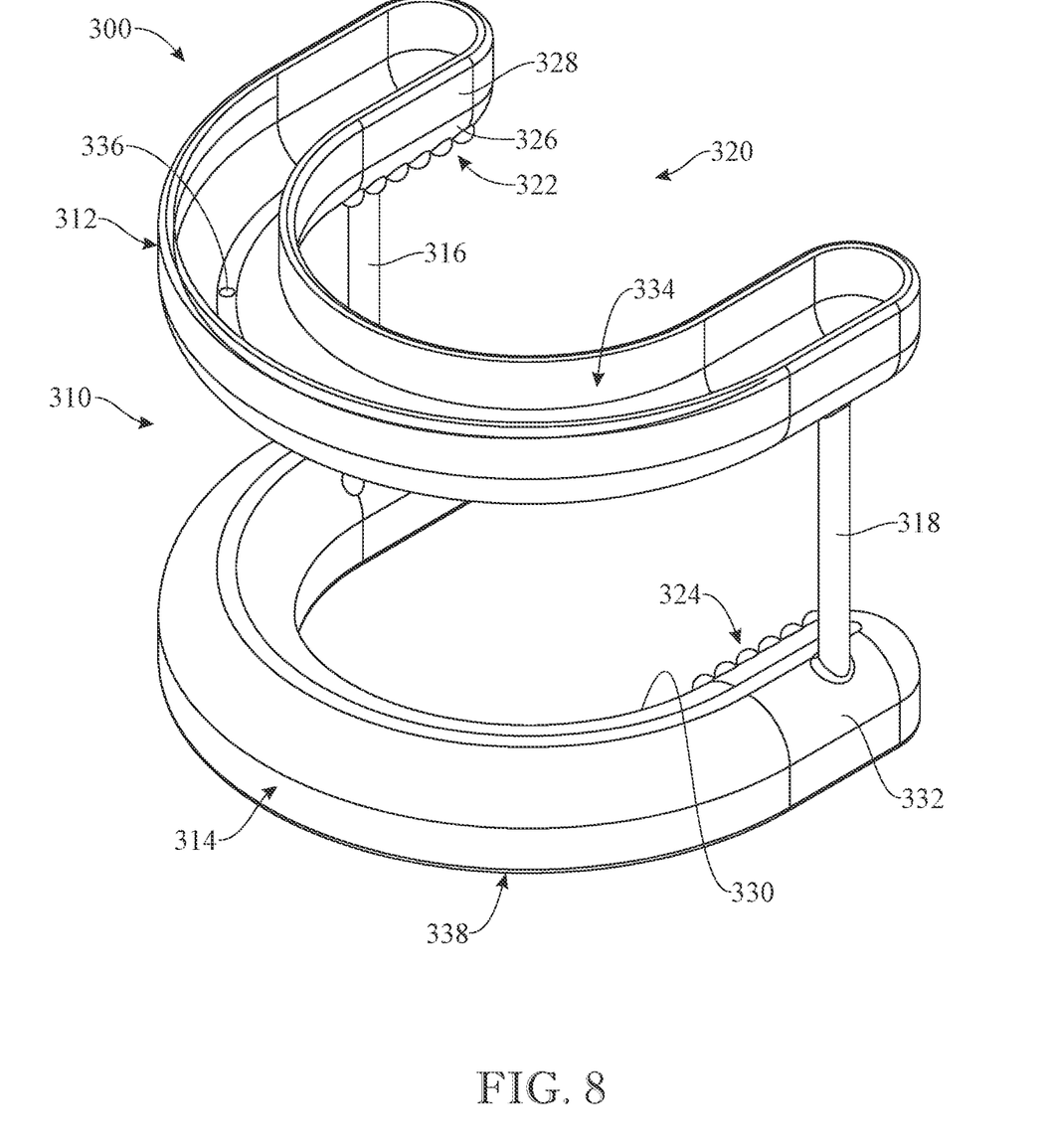
FIG. 8 is a top, front isometric view of an oral massage device in accordance with a second illustrative embodiment of the present invention including a vibration element.

Turning now for the moment to FIG. 8, there is disclosed an alternative embodiment of an oral massage device 300. Oral massage device 300 is constructed and provided substantially identically to oral massage device 100 including a mouth guard 310 having upper and lower guards 312 and 314, respectively. The upper and lower guards 312 and 314 are spaced apart and connected together by a first spacer shaft 136 and a second spacer shaft 318. In this embodiment, the oral massage device 300 includes a plurality of vibratory devices 320 incorporated into the upper and lower guards 312 and 314 to vibrate the member 500 of the subject thereby stimulating the member 500 to encourage an earlier climax.

Specifically, the upper guard 312 includes an upper vibrator device 322 and the lower guard 314 includes a lower vibratory device 324. The upper vibratory device 322 may be positioned at various locations on the upper guard 312 for example, along an inner surface 326 of a first end portion 328 of the upper guard 312. Similarly, the lower vibrator device 324 may be positioned on the same side of the mouth guard 310 as the upper vibratory device or, as shown, may be positioned on an opposite side for example, on an inner surface 330 of a second end portion 332 of the lower guard 314. Activation and operation of the plurality of vibratory devices 320 may be direct or remotely operated by the user 400 or the subject. The upper and lower vibratory devices 322 and 324 may be operated simultaneously, alternatively or separately, as desired.

Further, the upper guard 312 defines an upper channel 334 for receipt of the user 400's teeth and any flavored liquid or gel as noted hereinabove. The upper guard 312 further includes fluid holes 336 for passage of the flavored liquid or gel into the mouth 402 of the user 400. The lower guard 314 also defines a channel 338 similar to lower channel 124 described hereinabove with regard to the lower guard 114 of the oral massage device 100.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An oral massage device for receipt in a mouth of a user to stimulate a penis or member of a subject, the oral massage device comprising:
    a mouth guard having an upper guard defining an upper channel and a lower guard defining a lower channel,
    a first spacer shaft attached to and extending between said upper guard and said lower guard,
    a second spacer shaft attached to and extending between said upper guard and said lower guard; and
    a stimulation device positioned on at least one of said upper and lower guards, wherein the stimulation device is a plurality of roller balls.

2. The oral massage device of claim 1, wherein the plurality of roller balls is positioned on the upper guard.

3. The oral massage device of claim 2, wherein the plurality of roller balls is rotatably supported in a track in the upper guard.

4. The oral massage device of claim 3, wherein the track in the upper guard is formed in an undersurface of the upper guard.

5. The oral massage device of claim 1, wherein the stimulation device includes a plurality of roller balls positioned on the lower guard.

6. The oral massage device of claim 5, wherein the plurality of roller balls is rotatably mounted in a track in the lower guard.

7. The oral massage device of claim 6, wherein the track in the lower guard is formed in an oversurface of the lower guard.

8. The oral massage device of claim 1, wherein the upper guard includes at least one fluid drip hole therethrough.

9. The oral massage device of claim 8, wherein the at least one fluid drip hole is dimensioned and configured such that a fluid or soft gel provided in the upper channel in the upper guard flows therethrough and into the user's mouth.

10. The oral massage device of claim 1, wherein the first and second spacer shafts are of the same length and are fixedly or removably mounted to the upper and lower guards.

11. The oral massage device of claim 1, wherein the upper and lower guards are formed of a soft, non-abrasive material.

12. The oral massage device of claim 11, wherein the soft, non-abrasive material is sterilizable.

13. An oral massage device for receipt in a mouth of a user to stimulate a penis or member of a subject, the wheel oral massage device comprising:
    a mouth guard having an upper guard defining an upper channel and a lower guard defining a lower channel, wherein at least one of the upper and the lower channel includes a track configured to receive a plurality of roller balls, and further wherein the upper guard includes at least one fluid drip hole therethrough such that a fluid or soft gel provided in the upper channel in the upper guard flows through the at least one fluid drip hole and into the user's mouth;
    a first spacer shaft attached to and extending between said upper guard and said lower guard;
    a second spacer shaft attached to and extending between said upper guard and said lower guard; and
    a stimulation device positioned on at least one of said upper and lower guards.

14. An oral massage device for receipt in a mouth of a user to stimulate a penis or member of a subject, the oral massage device comprising:
    a mouth guard comprised of a soft, non-abrasive material, the mouth guard having an upper guard defining an upper channel and a lower guard defining a lower channel, wherein at least one of the upper and the lower channel includes a track configured to receive a plurality of roller balls, and further wherein the upper guard includes at least one fluid drip hole therethrough such that a fluid or soft gel s we provided in the upper channel in the upper guard flows through the at least one fluid drip hole and into the user's mouth;
    a first spacer shaft attached to and extending between said upper guard and said lower guard;
    a second spacer shaft attached to and extending between said upper guard and said lower guard; and a stimulation device positioned on at least one of said upper and lower guards, wherein the stimulation device includes vibratory functionality.

15. The oral massage device of claim 14, wherein the stimulation device is positioned on the upper guard.

16. The oral massage device of claim 14, wherein the stimulation device is positioned on the lower guard.

\* \* \* \* \*